US006583356B2

United States Patent
Arthur et al.

(10) Patent No.: US 6,583,356 B2
(45) Date of Patent: Jun. 24, 2003

(54) WIRE PROTECTION GROMMET FOR HIGH-SPEED COMMUNICATIONS CABLING

(75) Inventors: Richard L. Arthur, Vienna, WV (US); Stephen T. English, Williamstown, WV (US); Joseph B. Stout, Vienna, WV (US)

(73) Assignee: Walker Systems, Inc., Williamstown, WV (US)

(*) Notice: Subject to any disclaimer, the term of this patent is extended or adjusted under 35 U.S.C. 154(b) by 0 days.

(21) Appl. No.: 09/888,828

(22) Filed: Jun. 25, 2001

(65) Prior Publication Data

US 2002/0100601 A1 Aug. 1, 2002

Related U.S. Application Data

(63) Continuation-in-part of application No. 09/252,398, filed on Feb. 18, 1999, now Pat. No. 6,259,034.
(60) Provisional application No. 60/075,239, filed on Feb. 19, 1998.

(51) Int. Cl.[7] .............................................. H01B 17/26
(52) U.S. Cl. .............. 174/65 G; 174/65 R; 174/153 G; 174/152 G; 385/134
(58) Field of Search ..................... 174/65 G, 65 R, 174/151, 152 G, 153 G, 65 SS, 48, 49, 135; 248/56; 16/2.1, 2.2; 439/604, 587, 274, 275; 385/134, 135

(56) References Cited

U.S. PATENT DOCUMENTS

| | | | |
|---|---|---|---|
| 3,053,564 A | 9/1962 | Evans et al. | |
| 3,099,057 A | 7/1963 | Cook | |
| 3,518,359 A | 6/1970 | Trimble et al. | |
| 4,002,821 A * | 1/1977 | Satoh et al. | 174/153 G |
| 4,487,998 A | 12/1984 | Pegram | |
| 4,499,332 A | 2/1985 | Shea et al. | |
| 4,588,853 A * | 5/1986 | Confer | 174/48 |
| 4,685,173 A | 8/1987 | Pavur | |
| 4,797,513 A | 1/1989 | Ono et al. | |
| 4,822,079 A | 4/1989 | Schulte | |
| 4,827,080 A | 5/1989 | Castellane et al. | |
| 5,003,130 A | 3/1991 | Danforth et al. | |
| 5,071,143 A * | 12/1991 | Byerly et al. | 174/152 G |
| 5,090,644 A | 2/1992 | Lenker | |
| 5,422,437 A | 6/1995 | Schnell | |
| 5,453,579 A | 9/1995 | Cohea | |

(List continued on next page.)

FOREIGN PATENT DOCUMENTS

WO    WO 99/43064    8/1999

*Primary Examiner*—Dean A. Reichard
*Assistant Examiner*—Angel R. Estrada
(74) *Attorney, Agent, or Firm*—McAndrews, Held & Malloy, Ltd.

(57) ABSTRACT

A wire protection grommet is constructed for installation in a wire pull opening in the cell of a cellular raceway. The grommet is sized for insertion through the wire pull opening and defines central passages extending through the opening. The central passage has a radiused portion defining a wire pull strain relief to prevent wires that pass through the grommet from being bent beyond a predetermined bend radius. The grommet is constructed to lockingly engage into the wire pull opening so that it is not displaced during use. The distal end of the grommet may be weighted so that the grommet correctly orients itself in the opening during installation. The grommet may also include a wire storage section around which excess wiring can be wrapped. Hooks may be provided for retaining the excess wire on the wire storage section. The grommet may include an opening or slot which extends to the central passage and which is sized to permit wires to be slid into the passage. The grommet may be configured for installation in a variety of opening sizes and shapes and at the transitions between various components of the raceway system, such as between the raceway cell and an activation box or between the raceway cell and a feeder duct.

3 Claims, 15 Drawing Sheets

U.S. PATENT DOCUMENTS

| | | | |
|---|---|---|---|
| 5,627,342 A | | 5/1997 | Kramer |
| 5,701,634 A | | 12/1997 | Uemura et al. |
| 5,806,140 A | * | 9/1998 | Carlson et al. .......... 174/153 G |
| 5,898,129 A | * | 4/1999 | Ott et al. ....................... 174/59 |
| 6,051,795 A | * | 4/2000 | Fisher et al. ............ 174/153 G |
| 6,088,874 A | * | 7/2000 | Nakate et al. ............ 174/65 G |
| 6,119,305 A | * | 9/2000 | Loveall et al. .......... 174/152 G |
| 6,150,608 A | * | 11/2000 | Wambeke et al. ........ 174/65 G |
| 6,376,777 B1 | * | 4/2002 | Ito et al. .................. 174/152 G |
| 6,406,194 B1 | * | 6/2002 | Neale et al. ............ 174/152 G |

* cited by examiner

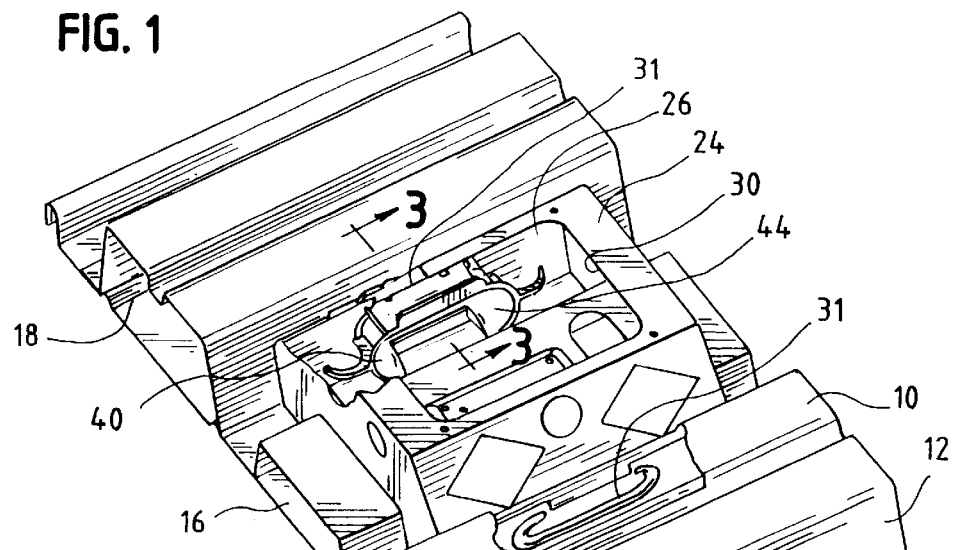
FIG. 1
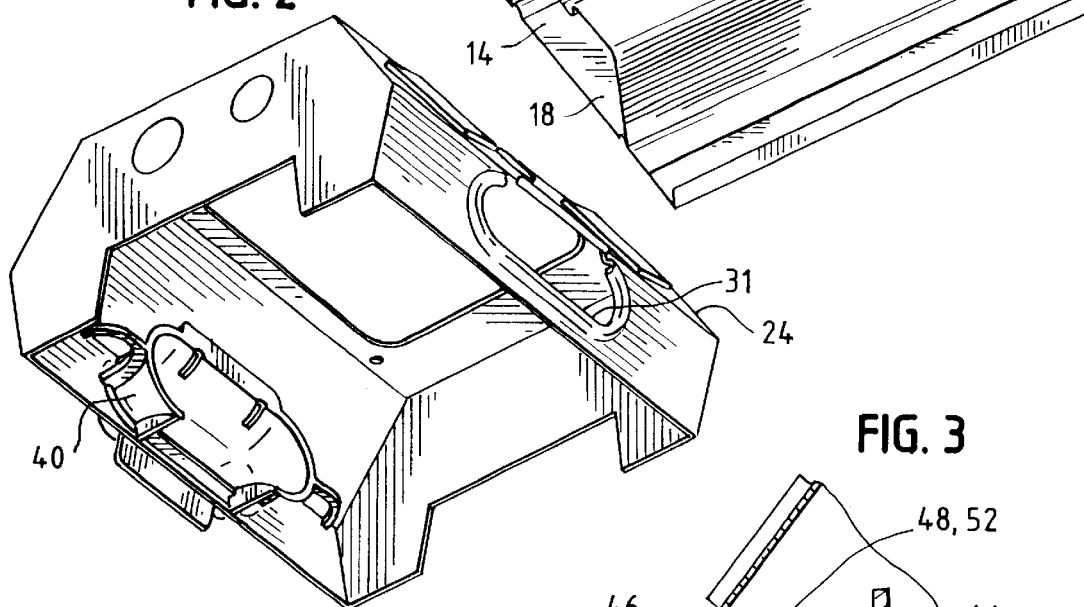
FIG. 2
FIG. 3
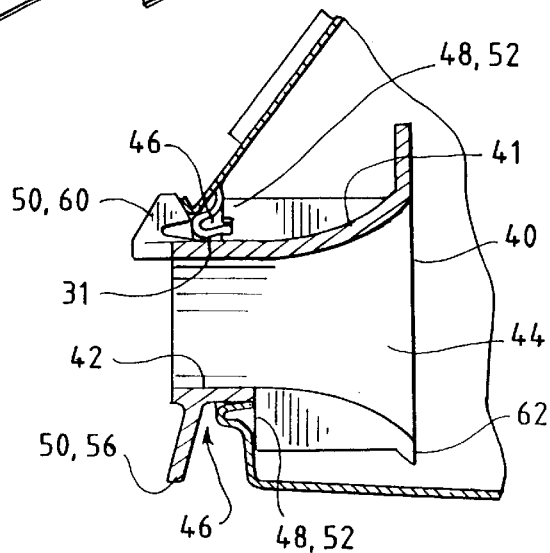

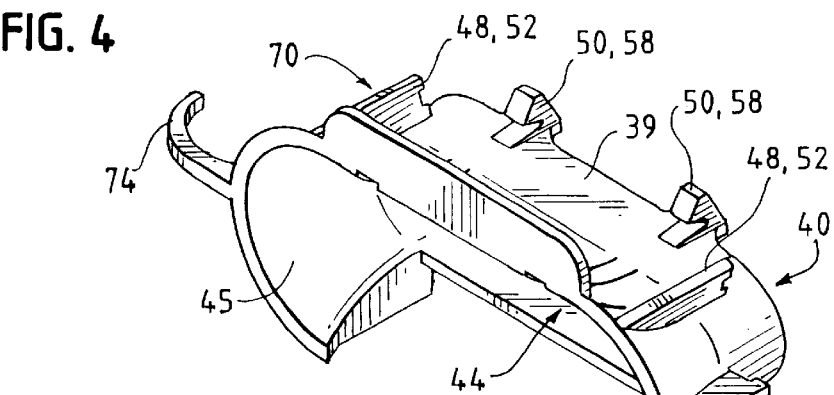
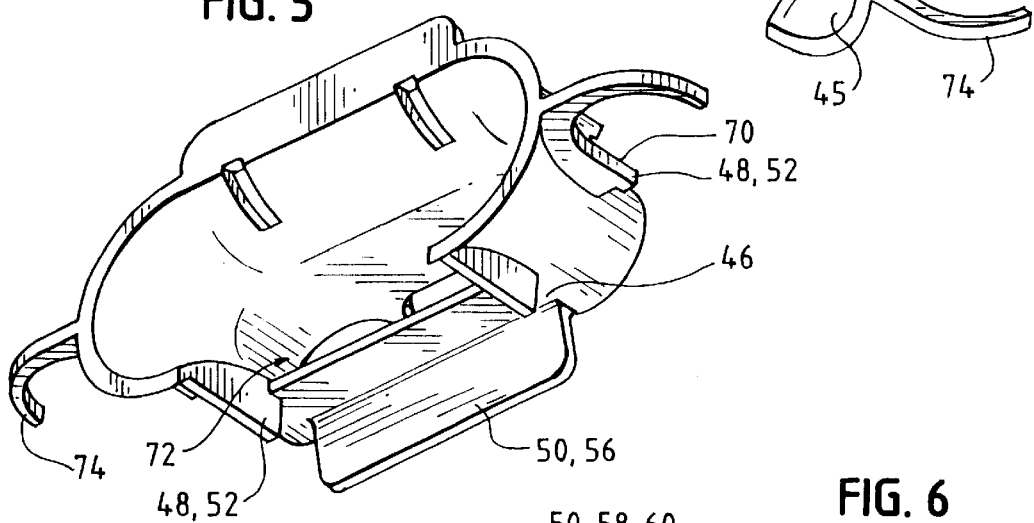
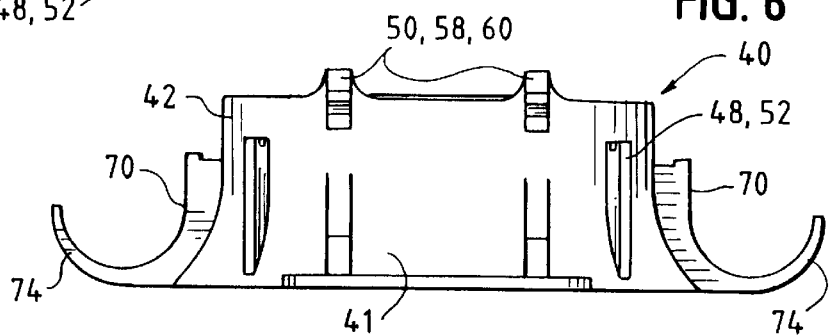
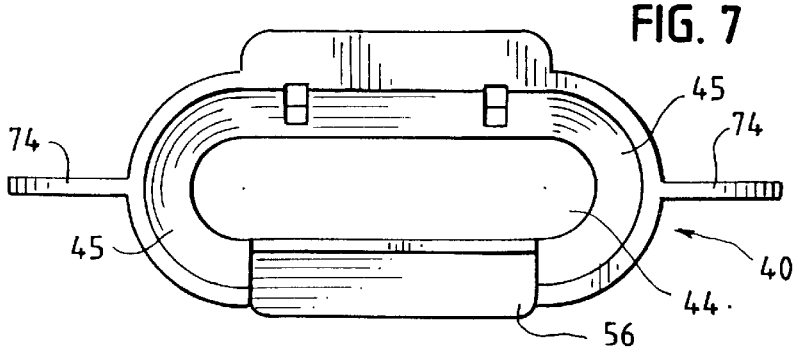

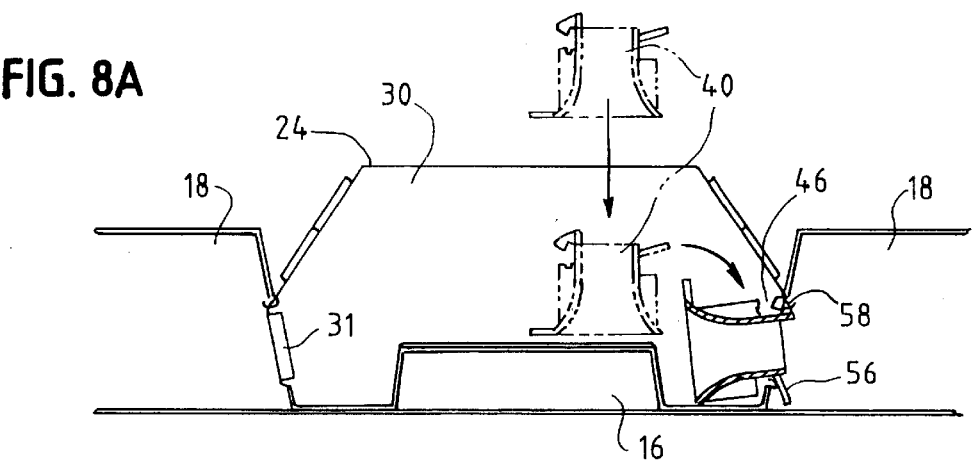
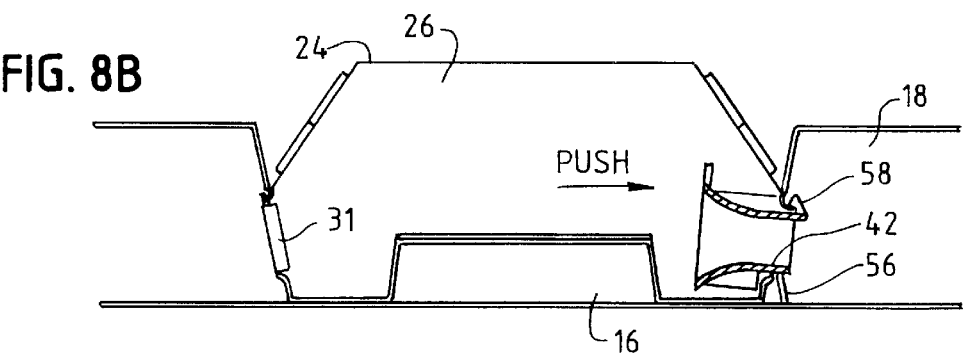
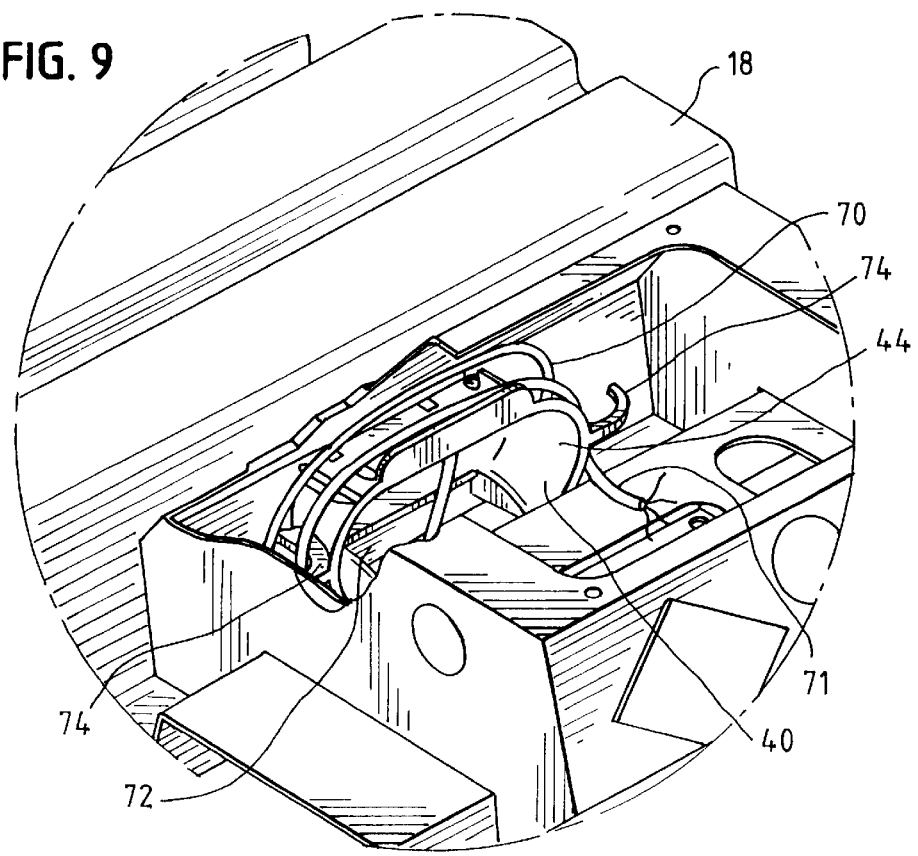

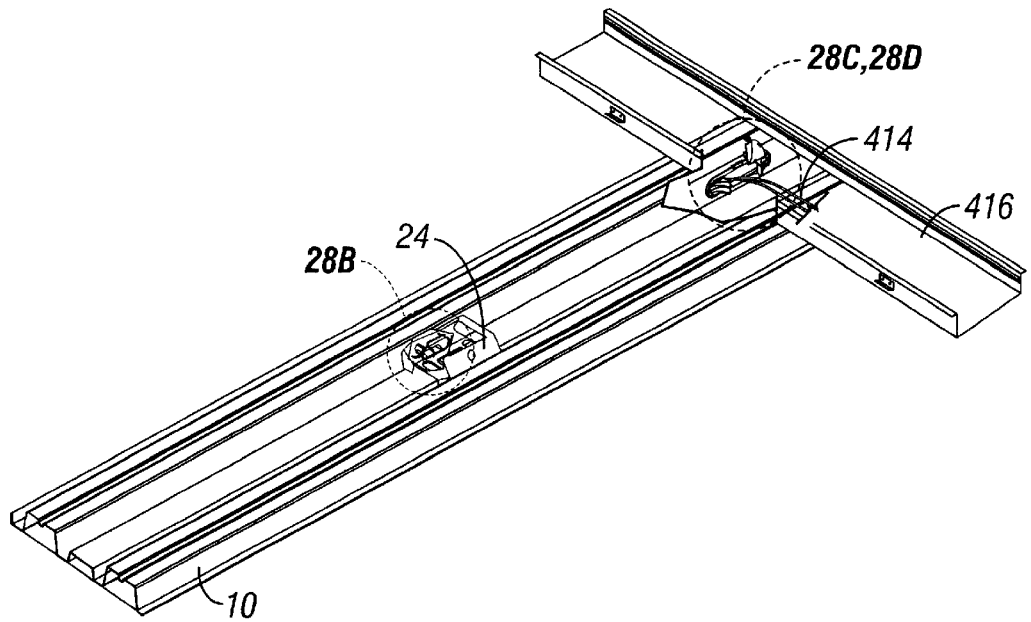
FIG. 28A
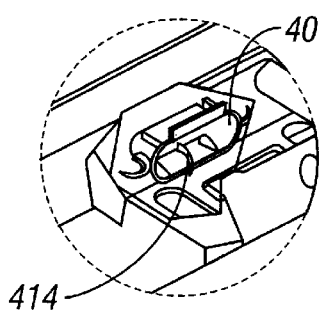    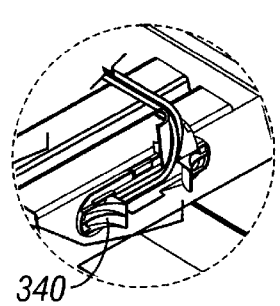    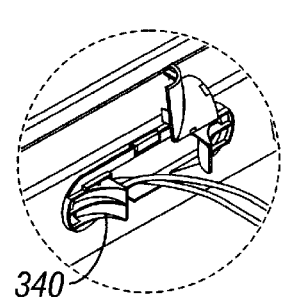
FIG. 28B    FIG. 28C    FIG. 28D

WIRE PROTECTION GROMMET FOR HIGH-SPEED COMMUNICATIONS CABLING

CROSS-REFERENCE TO RELATED APPLICATIONS

This application is a continuation-in-part of application Ser. No. 09/252,398, filed on Feb. 18, 1999 now U.S. Pat. No. 6,259,034, which claims priority benefits from U.S. Provisional Patent Application Ser. No. 60/075,239 filed Feb. 19, 1998.

STATEMENT REGARDING FEDERALLY SPONSORED RESEARCH OR DEVELOPMENT

Not Applicable

BACKGROUND OF THE INVENTION

The present invention is directed to in-floor raceway wiring systems, and more particularly to a wire pull grommet for preventing high-speed communications cabling from being bent excessively at the transitions between adjacent raceway components, including at the transition from between an activation box, such as a preset, and the cellular raceway, and at the transition between a cellular raceway and a feeder duct.

Modem office buildings require electric power, communication, and computer data services in various combinations at a large number of locations. Often these needs are addressed by in-floor cellular raceway systems. Cellular raceway systems typically include a cellular metal deck or cellular raceway, which rests directly on the subfloor. The cellular raceway includes a central portion or cell for carrying power cables and a pair of communication/data cells on opposite sides of the power cell. One of the communication cells may carry telephone cable and the other may carry computer, data, or other low potential cables. In addition, the cellular raceway system may include a series of feeder ducts for feeding power and communications cabling from the supply (distribution) closet and to the cellular raceway. The feeder ducts typically run perpendicular to and above the cells of the cellular raceway. Both the cellular raceway and the feeder ducts are covered with concrete for the finished floor. Access to the underfloor service raceways is obtained through activation boxes in the form of presets and aftersets, for example. Presets are activation boxes are mounted on the raceways at desired locations before the concrete floor is poured, whereas aftersets are mounted on the raceway after the floor is poured. The activation box defines a hollow interior compartment interconnected with the interiors of the raceway cells to provide access to the services that are carried in cells. In use, cables are routed from the supply closet, through the feeder duct, into the raceway cells, and in turn into the activation box.

Certification standards, such as Underwriters Laboratories (UL) and the National Electric Code, require the transitions between raceway components, such as the opening between the preset and the cell, be grommeted so as to protect cables from being abraded and damaged as they are pulled through the opening. Similarly, current EIA/TIA standards require that any opening that will be used to pull category 5 type data cable or fiber optic cable must have a feature that will prevent cable from being damaged when pulled around a corner.

Wire abrasion has typically been addressed via a rubber ring, which is press fit around the edge of the opening to protect against abrasion by eliminating sharp metal edges. While these rubber rings are suitable for use with telephone and low-speed communications cables, such as telephone lines, they are not acceptable for use with modem, high-speed data cabling such as fiber optics and category 5 cabling. In particular, excessive bending of high-speed data cable has dramatic, negative effects on the data transmission rates through such cabling. The traditional press-fit grommets discussed above are not satisfactory because they do not provide any means for preventing excessive bending of the cables, but instead merely function to prevent wire abrasion. One potential solution is to design the raceway system to include rounded corners at the junctions of its adjacent components and to include rounded wire pull openings with sufficient bend radiuses. However, this "solution" requires costly retooling and offers no solution for buildings where the cellular raceway systems were installed prior to the implementation of these requirements. Alternatively, some raceway systems rely on the installers to ensure that the cabling is not bent beyond the minimum bend radius. As is readily apparent, this "solution" is ripe with pitfalls. For example, although the cabling may ultimately installed with the correct bend radius, it is possible for the cables to be bent excessively during installation, which can damage the cabling and adversely effect transmission rates through the cabling. Hence, there is a need for a grommet that can be installed in wire pull openings to ensure that high-speed communications cables are not subjected to excessive bending. Moreover, there is a need for a grommet that can be installed into existing raceway systems to bring these applications into compliance with current certification standards. There is also a need for a wire pull grommet that can be installed into an existing raceway installation without disconnecting the cabling.

BRIEF SUMMARY OF THE INVENTION

One object of the present invention is to provide a grommet for mounting in a wire pull opening of a cellular raceway system and which prevents high-speed communications cables from being bent excessively.

Another object of the present invention is to provide a grommet for mounting in a wire pull opening extending between an activation box and a cell of a cellular raceway system and which prevents high-speed communications cables from being bent excessively.

Another object of the present invention is to provide a grommet which can be mounted at the junction of a feeder duct and a raceway cell to provide prevent excessive bending of high-speed communications cables.

Another object of the present invention is to provide a grommet for mounting in a wire pull opening that provides a smooth, radiussed surface for pulling wires.

Still another object of the present invention is to provide a wire pull grommet that has a passage defining a wire pull strain relief.

Yet another object of the present invention is to provide a wire pull grommet that includes a wire storage section for storing excess.

A further another object of the present invention is to provide a wire pull grommet that can be mounted in different sizes of wire pull openings.

Another object of the present invention is to provide a wire pull grommet having a wire storage portion around which excess wiring can be wrapped.

Another object of the present invention is to provide a wire pull grommet that is low cost and economical to manufacture.

Yet another object of the present invention is to provide a wire pull grommet that is durable and easy to install.

Another object of the present invention is to provide a wire pull grommet that can be retrofit into existing cellular raceway systems.

A further object of the present invention is to provide a wire pull grommet that can be retrofitted into existing cellular raceway system without the disconnection of previously installed cabling.

These and other objects and advantages are achieved by a wire protection grommet constructed for installation in a wire pull opening of a cellular raceway. A wire protection grommet is constructed for installation in a wire pull opening in the cell of a cellular raceway. The grommet is sized for insertion through the wire pull opening and defines central passages extending through the opening. The central passage has a radiused portion defining a wire pull strain relief to prevent wires that pass through the grommet from being bent beyond a predetermined bend radius. The grommet is constructed to lockingly engage into the wire pull opening so that it is not displaced during use. The distal end of the grommet may be weighted so that the grommet correctly orients itself in the opening during installation. The grommet may also include a wire storage section around which excess wiring can be wrapped. Hooks may be provided for retaining the excess wire on the wire storage section. The grommet may include an opening or slot which extends to the central passage and which is sized to permit wires to be slid into the passage. The grommet may be configured for installation in a variety of opening sizes and shapes and at the transitions between various components of the raceway system, such as between the raceway cell and an activation box or between the raceway cell and a feeder duct.

BRIEF DESCRIPTION OF THE SEVERAL VIEWS OF THE DRAWING

FIG. 1 is a partial perspective view of a raceway system employing a wire protection grommet according to the present invention;

FIG. 2 is bottom view showing the wire protection grommet installed in a preset;

FIG. 3 is a cross-section view along line 3—3 of FIG. 1;

FIG. 4 is a top perspective view of the wire protection grommet;

FIG. 5 is a bottom perspective view of the wire protection grommet;

FIG. 6 is a top elevation view of the wire protection grommet;

FIG. 7 is a front elevation view of the wire protection grommet; and

FIGS. 8A and 8B are cross-section views illustrating installation of the wire protection grommet into the wire pull opening of a raceway system.

FIG. 9 is a perspective view illustrating the manner in which excess wire can be stored on the grommet.

FIG. 28A is a partial perspective view of a raceway system further illustrating installation of the grommets of FIGS. 1 and 16.

FIGS. 28B–D are enlarged views of portions of FIG. 28A.

DETAILED DESCRIPTION OF THE INVENTION

Figure 10:
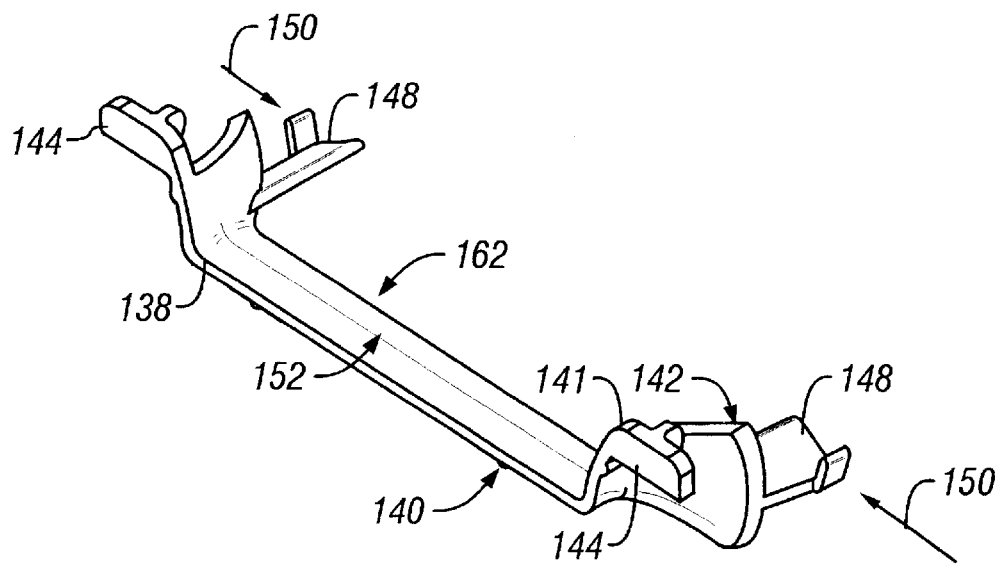
FIG. 10 is a top, front perspective view of a second, alternative embodiment of a wire protection grommet in accordance with certain aspects of the present invention.
Figure 11:
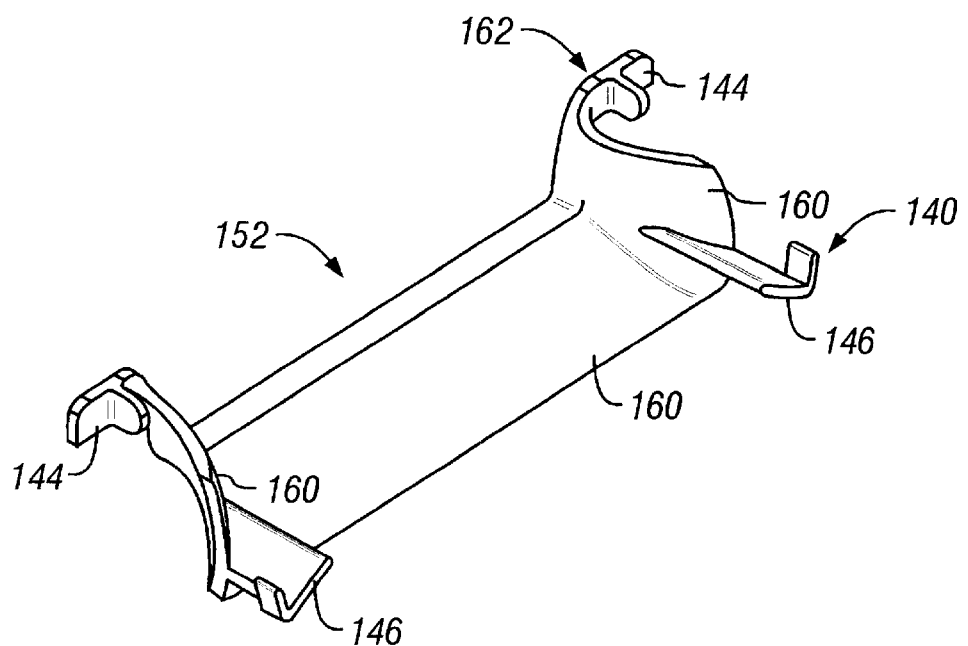
FIG. 11 is a top, rear perspective view of the wire protection grommet of FIG. 10.
Figure 12:
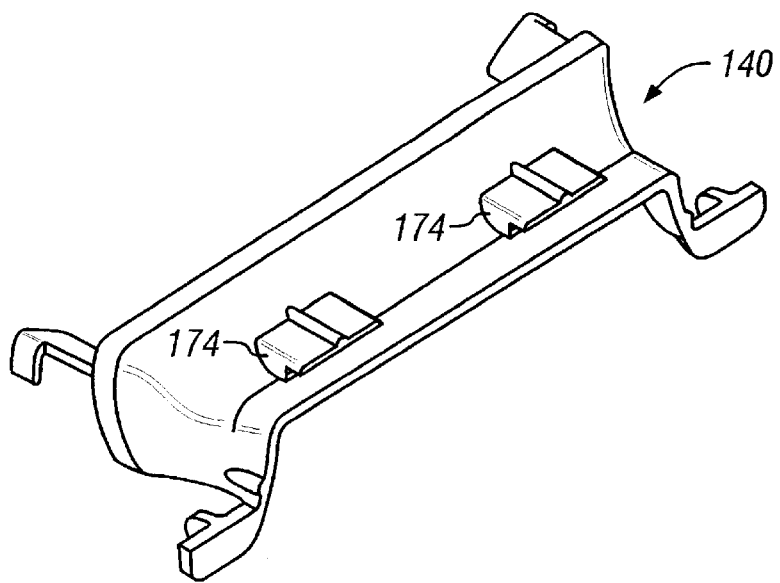
FIG. 12 is a bottom, front perspective view of the wire protection grommet of FIG. 10.
Figure 13:
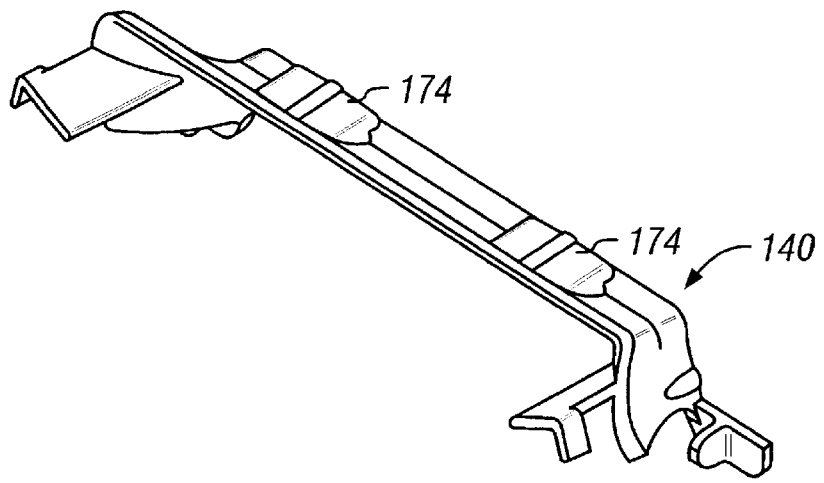
FIG. 13 is a bottom, rear perspective view of the wire protection grommet of FIG. 10.

While the invention will be described in connection with one or more embodiments, it will be understood that the invention is not limited to those embodiments. On the contrary, the invention includes all alternatives, modifications, and equivalents as may be included within the spirit and scope of the appended claims.

Referring now to FIG. 1 a cellular raceway 10 includes a top panel 12 and a bottom panel 14. The panels 12, 14 define a central power cell 16 and a pair of communication cells 18 that are positioned on opposite sides of the power cell. The cellular raceway 10 is positioned on a subfloor prior to pouring of the concrete floor. Activation boxes, illustrated in the form of presets 24 (one shown in FIG. 1), are mounted on the raceway 10 at preselected locations to provide access to the cells 16, 18 from the upper surface of the concrete floor. The preset 24 defines a hollow interior compartment 26 that is interconnected with the cells 16, 18 through openings to provide access to service cables that are carried inside the cells. A mud cap (not shown) is removably mounted over the top opening 30 of the preset 24. The mud cap prevents concrete from entering the interior compartment 26 of the preset 24 when the concrete floor is poured. After the concrete floor has hardened, the concrete above the mud cap is broken away and the mud cap is removed to provide access to the interior 26 of the preset 24. An activation assembly (not shown) that accepts a duplex receptacles or other wiring devices may then be installed in the preset 24.

Wire pull openings 31 extend between the interior 26 of the preset 24 and the communications cells 18 to provide access to the services carried in the communication cells. In the illustrated embodiment, the wire pull openings 31 are generally oval shaped. It will be appreciated however that the shape of these openings is merely illustrative.

Referring additionally to FIGS. 2 through 8B, a wire pull grommet 40 for mounting in the wire pull openings will now be described. The grommet 40 has a built-in bend radius for preventing damage to cables as they are pulled through the wire pull opening. The grommet 40 also is constructed to serve as a wire storage loop for storing excess wiring for future re-termination. In the preferred embodiment, the grommet can store approximately 1 meter of category 5-type cable or fiber optic cable. The grommet is preferably injection molded from a suitable material such as polyvinyl chloride (PVC). While the grommet is described in the context of a wire pull opening extending between a raceway cell and a preset, it is to be understood that the grommet is not so limited. The grommet can also be used, for example at the junction of a raceway cell and an afterset housing. Moreover, as described below, the grommet can be modified for use at a variety of wire pull openings, such as between a raceway cell and a feeder duct.

The grommet 40 has a housing or body 38 consisting of a proximal portion 41 and a distal portion 42. The proximal portion 41 has an outer circumferential dimension that is larger than the preset opening, whereas the distal portion is constructed for insertion through the wire pull opening 31. A central opening or passage 44 extends through the grommet 40 between the preset 24 and the raceway cell 18. The central passage 44 of the grommet 40 is sized so that the grommet 40 can be held by inserting one's fingers into the proximal end of the central passage. The proximal portion 41 of the grommet 40 is flared outwardly, as is the inner surface of the central opening 44. This flared construction gives the proximal end of the central opening 44 a smooth radiussed surface 45 that functions as a wire pull strain relief. Preferably, this surface has a radius of at least 1 inch. (In a version of the grommet that has been developed by the assignee, Walker Systems, Inc., this radius is 1.25 inches).

The outer surface of the grommet 40 has an annular slot 46 or groove that is configured to engage about the edge of the wire pull opening 31 to secure the grommet within the opening. In the illustrated embodiment, the longitudinal gap between a set of proximal stops 48, and a set of distal stops 50 define the annular slot 46. The proximal stops 48 are in the form of longitudinal ribs 52 or flanges extending along the outer surface of the proximal portion 41 of the grommet 40. The distal stops 50 are formed by a lower leg 56 and a pair of upwardly extending flanges 58. The lower leg 56 is angled so that its lower edge extends away from the proximal edge 62 of the grommet 40. The grommet is configured to fit in wire pull openings of different sizes. In the illustrated embodiment, the grommet fits in oval-shaped openings having a height on the order of 1.1 inches and a width ranging from 3.58 to 3.88 inches.

Installation of the grommet will now be described with reference to FIGS. 8A and 8B. The grommet 40 is initially lowered into the preset 24 through the top opening 30. The lower leg 56 of the grommet is then inserted through the wire pull opening and into the communication cell 18. The weight of the lower leg 56 acts to correctly orient the grommet 40 within the opening 31. As the distal portion 42 of the grommet 40 pivots downwardly, the upper flanges 58 come into contact with the upper edge of the wire pull opening 31. With continued upward pressure on the proximal end 41 of the grommet, the flanges 58 bias the grommet wall inwardly until the flanges move past the upper wall of the opening, and lock the wall within the groove 46. (See FIGS. 3 and 8A). If necessary, the grommet 40 can be removed from the opening by inserting a screwdriver into the gap between the top of the grommet and the sidewall of the preset and twisting the screwdriver.

The grommet 40 is constructed to provide a wire storage loop 70 for storing excess wire for future re-terminations. As is shown in FIG. 9, wire 71 is routed from the communication cell 18 and through the central passage 44. The wire then passes down through an opening 72 and is wrapped around the outer periphery of the grommet 40. Wire retention hooks 74 extend outwardly from the front or proximal edge of the grommet 40 to retain the wire on the wire storage section 70.

In the illustrated embodiment, the wire pull opening and the grommet are illustrated as being oval shaped. It will be appreciated, however, that the invention is not limited to this construction. For example, the wire pull opening and grommet could have circular cross sections.

Referring now to FIGS. 10–14B, a second embodiment of a wire protection grommet 140 according to certain aspects of the present invention will be described. This embodiment is constructed so that it can be installed into a new preset installation prior to pulling the wires, or it retrofitted into an existing installation without the need to disconnect the cabling that is installed in the preset.

The grommet 140 has a C-shaped housing or body 138 configured for installation into a wire pull opening. The housing 138 includes a front portion 141 that has an outer dimension that is larger than the wire pull opening and a distal portion 142 sized and constructed for insertion through a wire pull opening. The front portion 141 includes a pair of laterally extending legs 144 that are configured to engage against the wall of the preset around the wire pull opening to prevent the grommet from falling through the opening. The rear portion 142 includes a pair of rearwardly extending legs 146 that are adapted for insertion through the wire pull opening. Specifically, during installation, the legs 146 are squeezed inwardly, in the direction 150 so they may be inserted through the wire pull opening. Once the legs 146 pass through the opening, they flex outwardly to lock the grommet 140 into the opening.

A central passage 152 extends through the grommet 140 between the preset 156 and the raceway cell 158. This passage 152 is sized to receive a plurality of wires or cables 159. The passage has a smooth radiaused (convex) surface 160 which functions as a wire pull strain relief in the manner described above in connection with the first embodiment. The top of the passage 152 is open to allow cables to slide into the passage 152. In the illustrated embodiment, the top opening or slot 162 extends the entire width of the passage 152, thereby providing the housing 138 with a generally "C" shape when viewed from the front. It will be appreciated however that a narrower top opening could be provided to enhance the structural rigidity of the grommet and to provide a larger wire pull strain relief section. Moreover, a similar construction can be achieved by forming a slot in the wall of the grommet 40 of the first embodiment (or the grommet 340 of the third embodiment) to permit wires to be slid laterally into the central passage 44 instead of rooting them longitudinally through the passage.

Figure 14A:
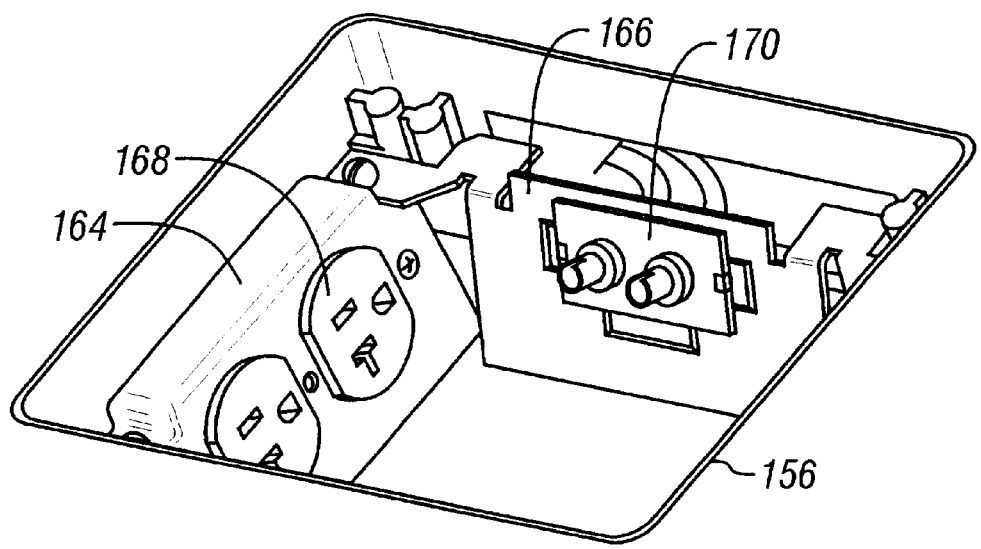
FIGS. 14A–C illustrate the wire protection grommet of FIG. 10 being installed into a wire pull opening.
Figure 14B:
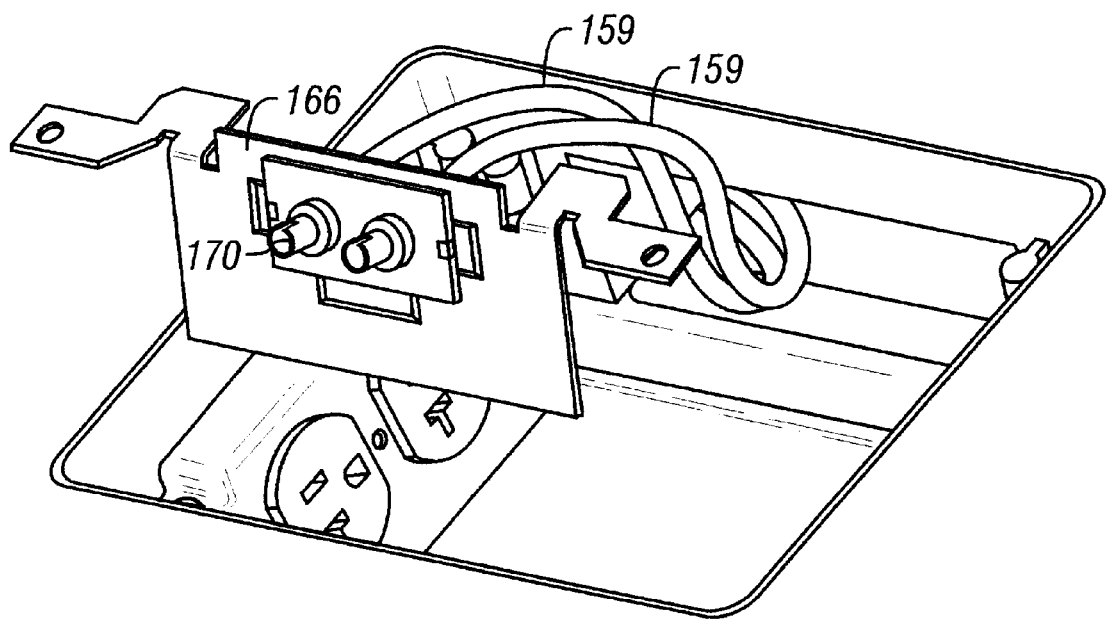
Figure 14C:
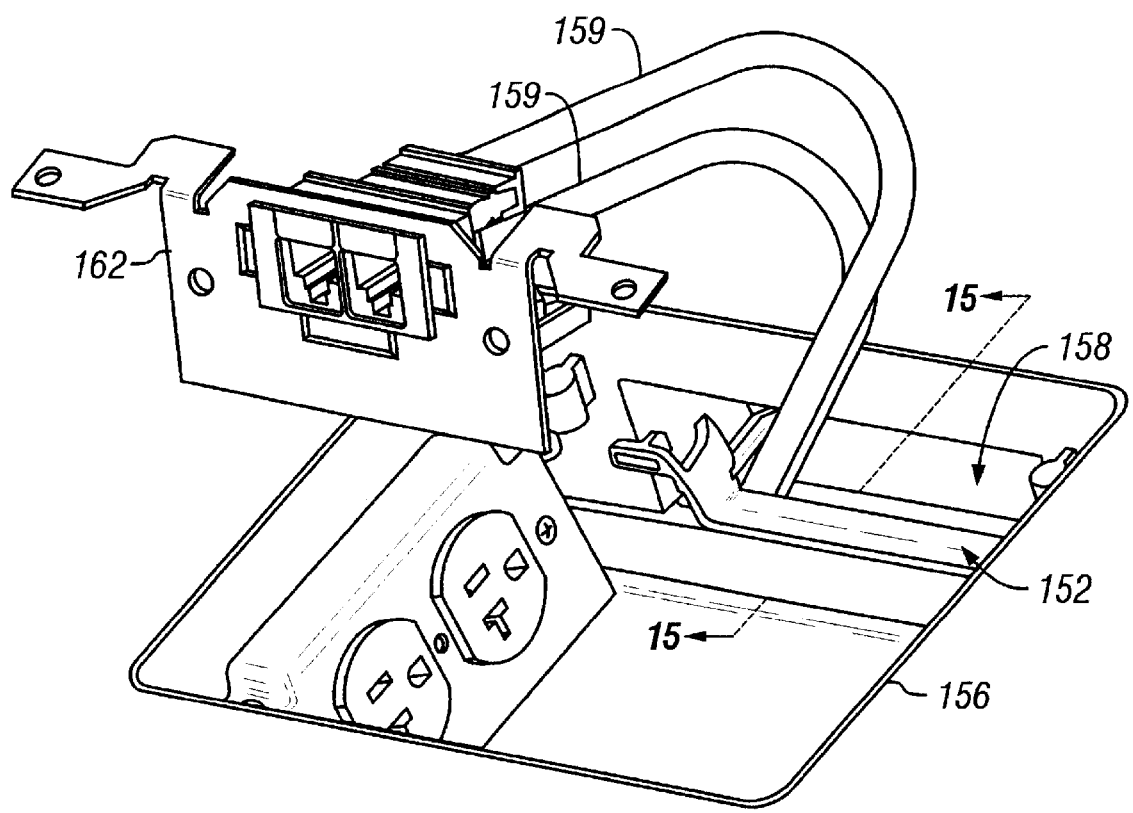
Figure 15:
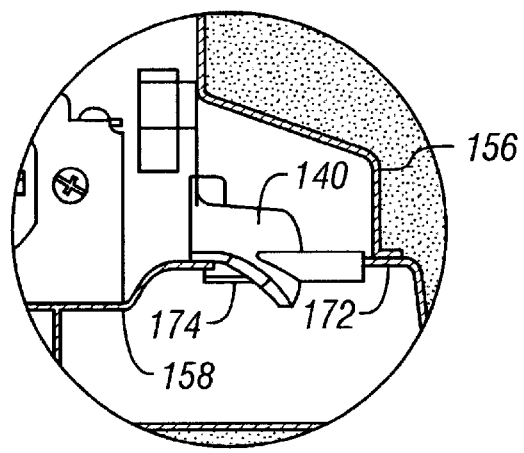
FIG. 15 is a cross sectional view along line 15—15 of FIG. 14B.
Figure 16:
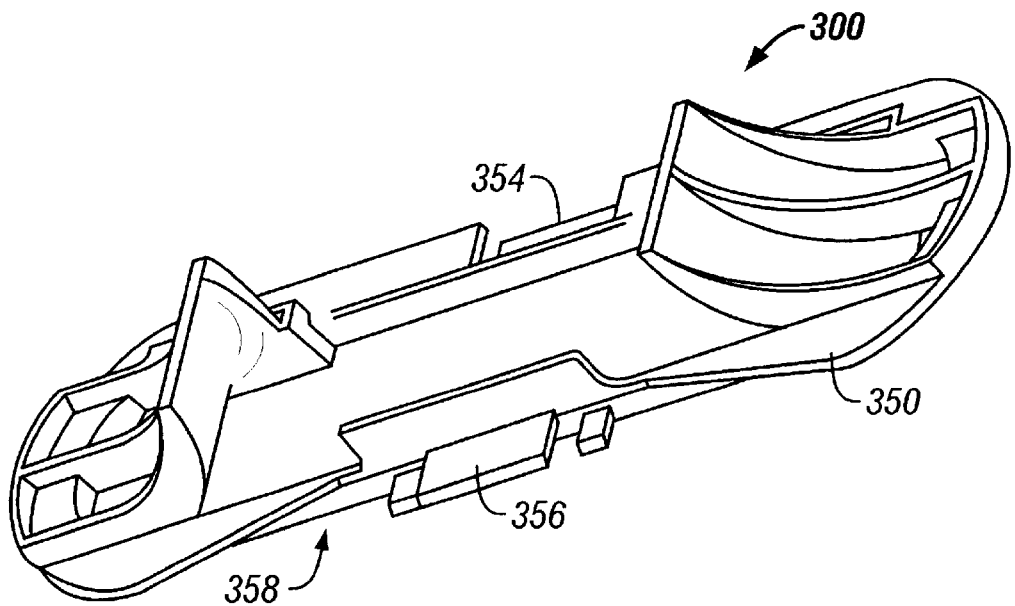
FIG. 16 is a front perspective view of a third, alternative embodiment of a wire protection grommet according to certain aspects of the present invention.
Figure 17:
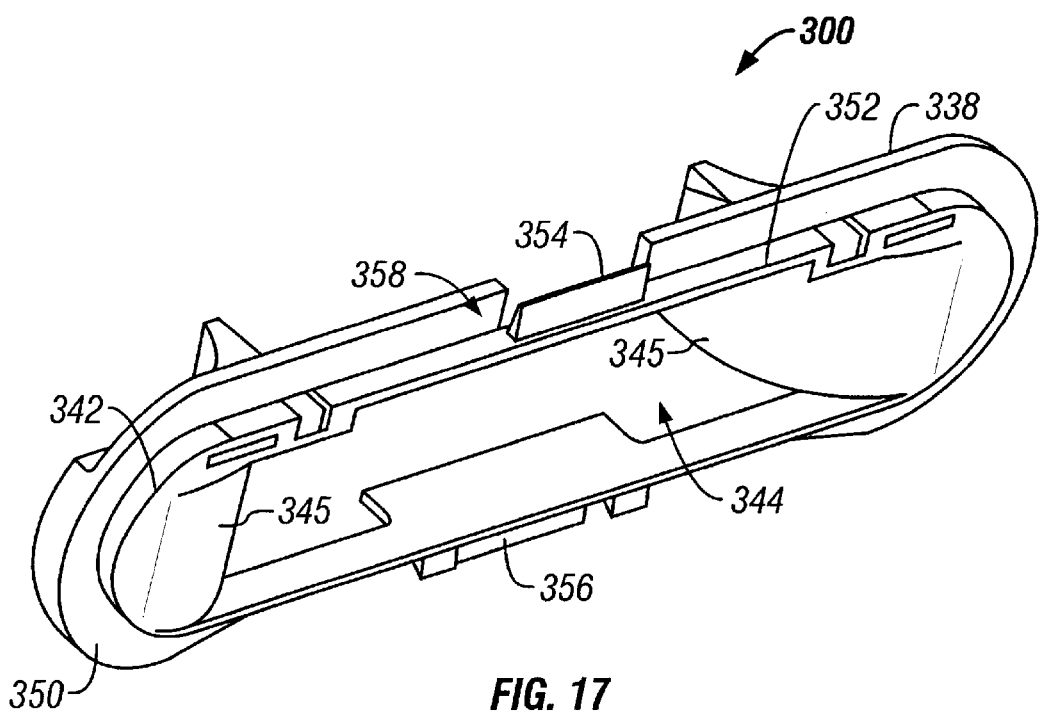
FIG. 17 is a rear perspective view of the wire protection grommet of FIG. 16.
Figure 18:
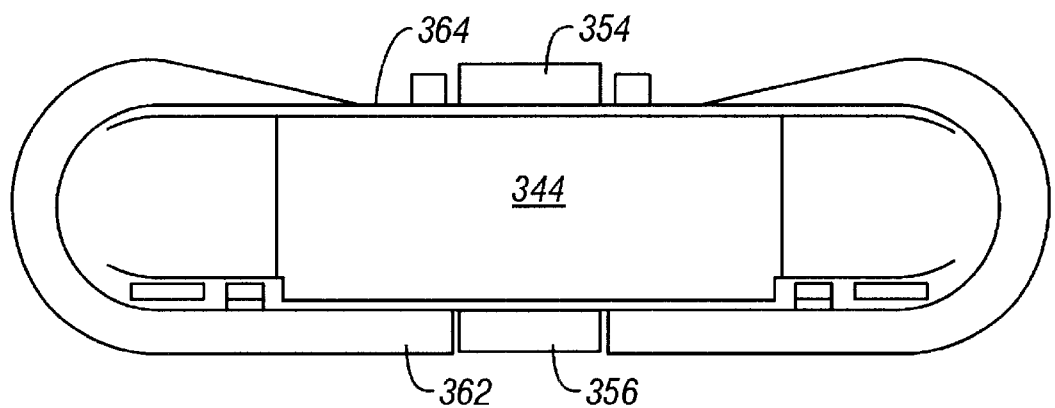
FIG. 18 is a front elevation view of the wire protection grommet of FIG. 16.
Figure 19:
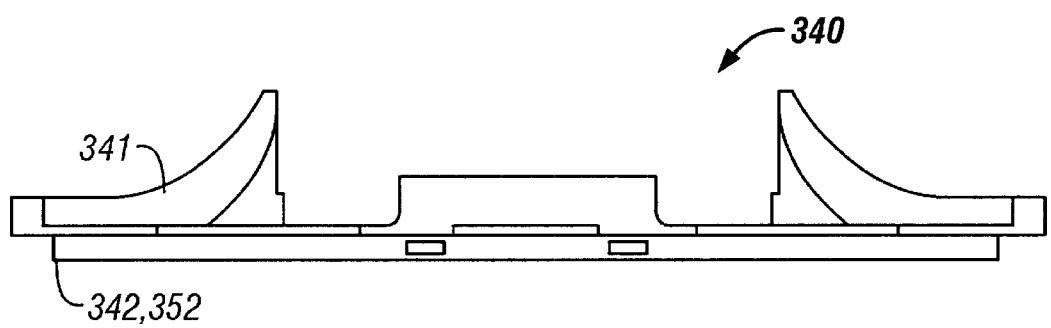
FIG. 19 is a top view of the wire protection grommet of FIG. 16.

Referring to FIGS. 14–15, installation of the grommet 140 into an existing preset installation will be briefly described. The preset 156 shown in FIG. 14 includes a pair of power brackets 164 (one shown) mounted on opposite walls of the present and a pair of data or communication brackets 166 (one shown) mounted on opposite walls of the preset. Each of the power brackets 164 is configured to support a duplex outlet 168 and each of the communication brackets 166 is configured to support a communication device 170, such as a coaxial or category 5 connector. The mounting brackets are secured to the preset by fasteners such as bolts (not shown). In order to install the grommet 140 into one of the communication openings, the fasteners are removed and the communication bracket 166 is lifted up and out of the preset 156. (See FIG. 14B). The grommet 140 is then slid over the wires so that the wires extend through the passage 152. Because the passage 152 has an open top 162, the grommet can be installed without disconnecting the cables 159 from the communication devices 170. Next, the grommet 140 is aligned with the wire pull opening 168 and the rear legs 146 are compressed inwardly, i.e. in the direction 150, to allow the legs to be slid through the wire pull opening 172. As the grommet 140 is slid into the opening 172, it is pressed downward until the rear legs 146 move past the wall of the raceway, at which time the legs snap outwardly to lock the grommet into the opening. As can best be seen in FIGS. 12 and 15, the bottom surface of the grommet presents a pair of retention hooks 174 that fit around the wall of the preset opening to secure and retain the grommet within the opening. Once the grommet is installed, the wires are fed back through the preset opening and the communication bracket is secured in place. This process can be repeated for the data opening on the opposite side of the preset. Moreover, a similar process is followed to install the grommet into a newly installed preset prior to installation of the communication devices and associated cabling.

Referring to FIGS. 16 to 20, a third embodiment of the wire protection grommet 340 is described. This embodiment configured for installation, for example, in a wire pull opening at the junction of a raceway cell and a feeder duct. (See, e.g., FIGS. 28A–D). The grommet 340 includes a housing or body 338 consisting of a proximal portion 341 and a distal portion 342. The proximal portion 341 has an outer dimension that is larger than the preset opening, whereas the distal portion is constructed for insertion through the wire pull opening 331. A central passage 344 extends through the grommet 340. The central passage 344 presents a smooth, radiussed surface 345, which functions as a wire pull strain relief in the manner described above in connection with the first embodiment.

The proximal portion 340 of the housing presents a rear wall 350 that is constructed to abut against the wall of the raceway around the wire pull opening. The rear portion 342 of the housing includes a wall or flange 352, which protrudes from the rear wall 350 of the housing. The flange 352 is configured for insertion through the wire pull opening and preferably presents an outer edge, which forms a close fit with the wire pull opening. Upper and lower locking tabs 354, 356 extend from the rear protrusion. The spaces between the locking tabs 354, 356 and the rear wall 350 and define a gap 358 that is sized and configured to receive the wall of the raceway. (See FIGS. 20A and 20B).

Figure 20A:
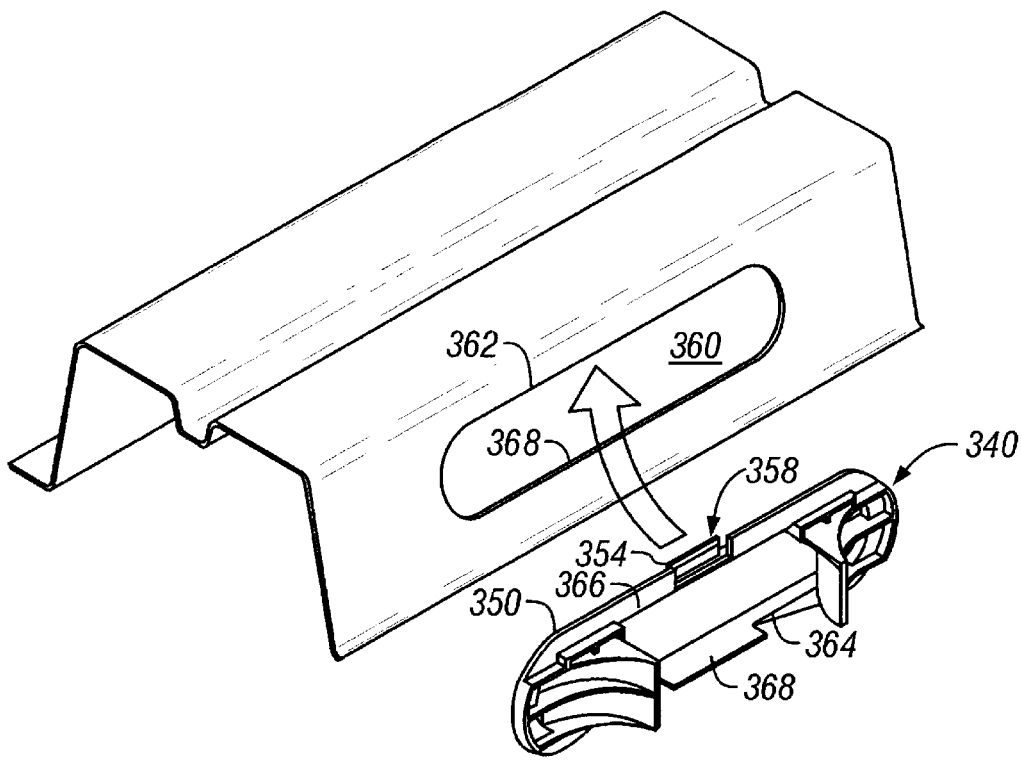
FIGS. 20A and 20B illustrate installation of the wire protection grommet of FIG. 16.
Figure 20B:
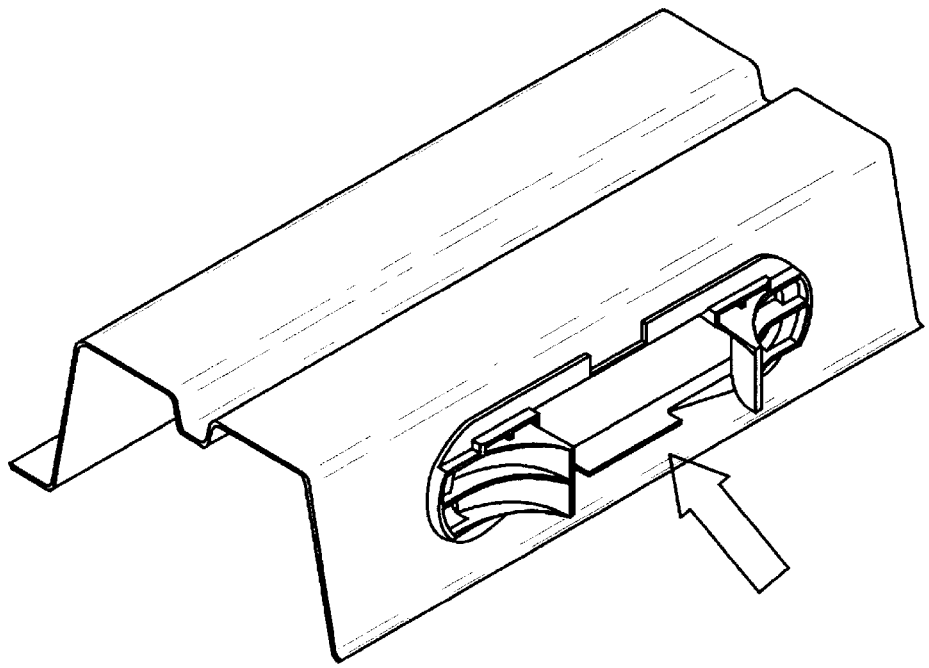
Figure 21:
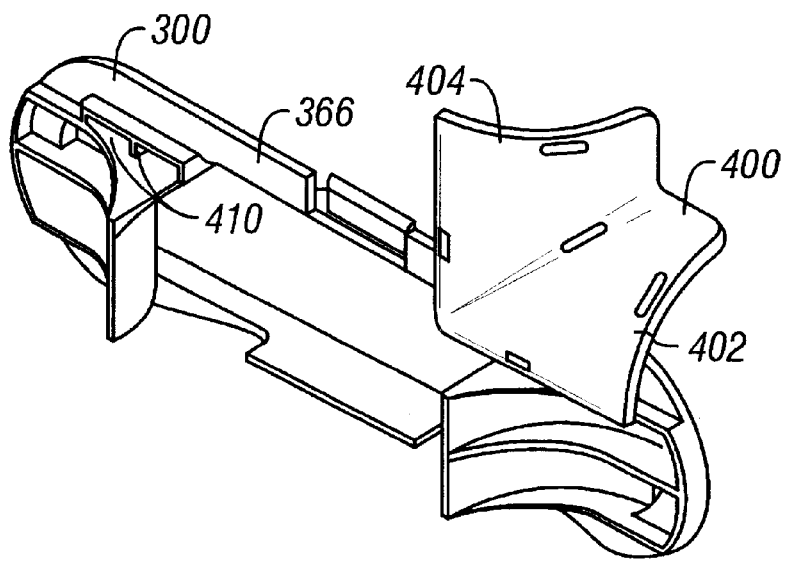
FIGS. 21 and 22 are perspective views illustrating the wire protection grommet of FIG. 16 in combination with a bend radius attachment.
Figure 22:
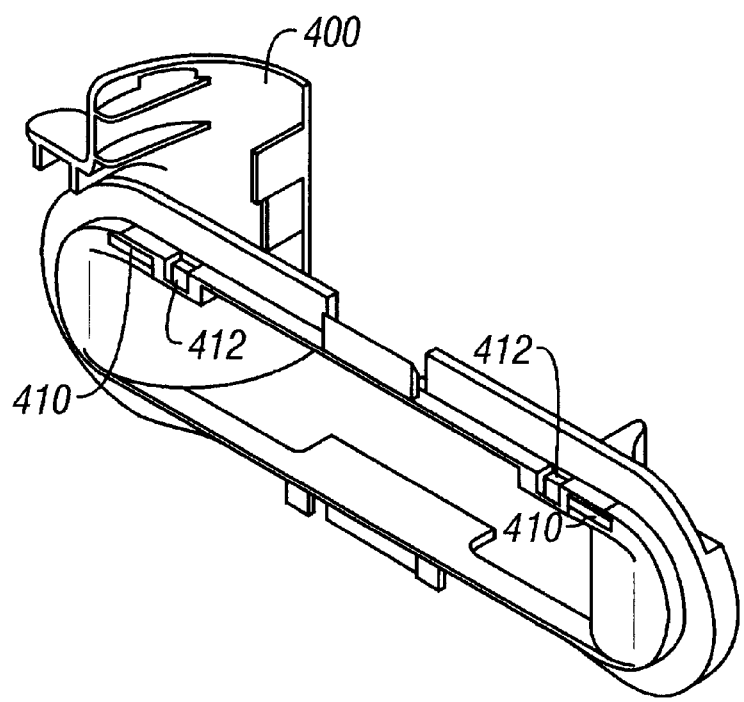
Figure 23:
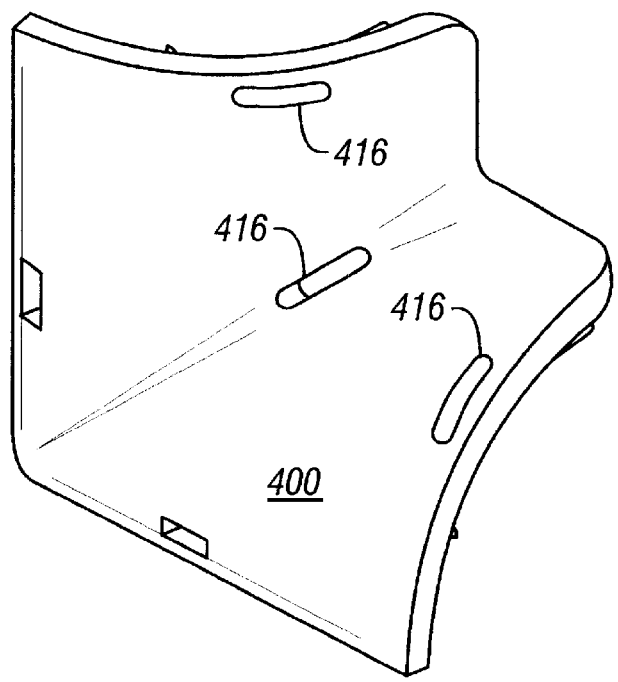
FIGS. 23 and 24 are perspective views of the bend radius attachment.
Figure 24:
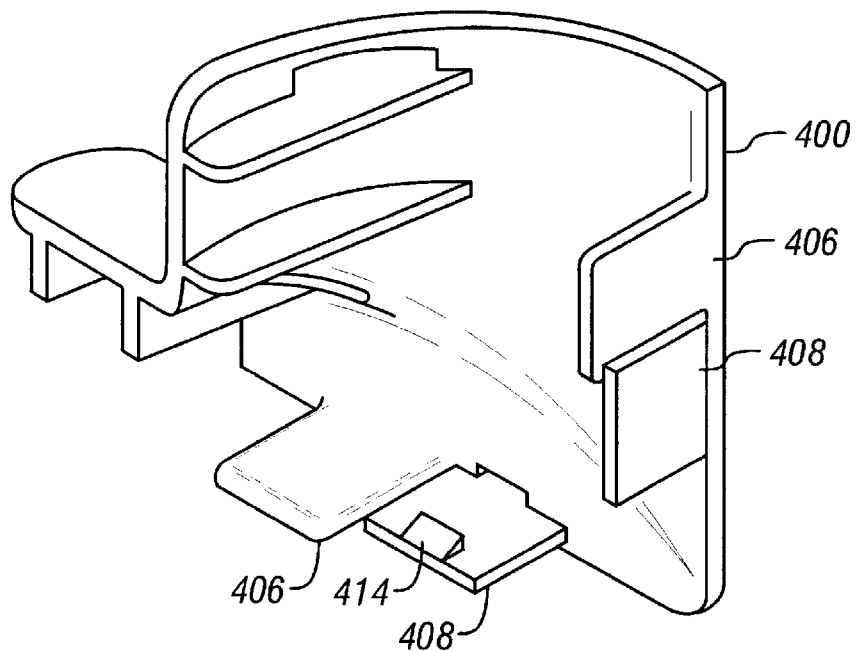
Figure 25:
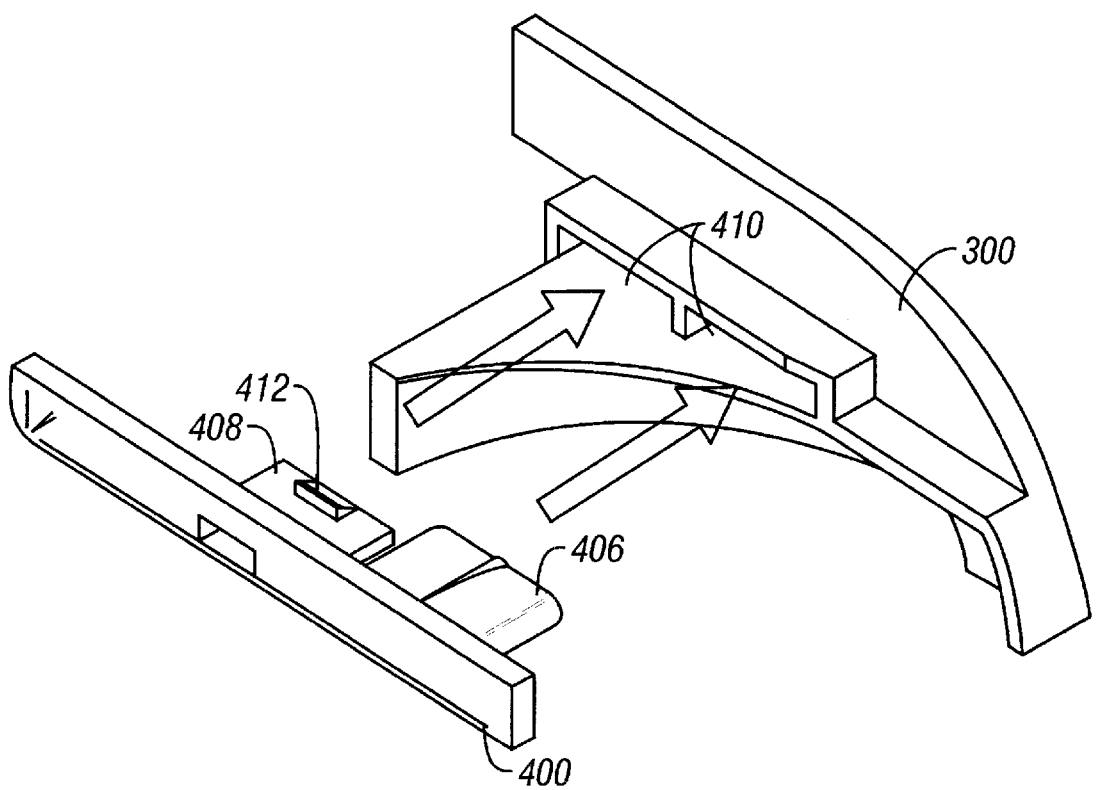
FIG. 25 is a partial perspective view illustrating the manner in which the bend radius attachment and the wire protection grommet are connected to one another.

Installation of the grommet 340 into a wire pull opening 360 will now be described with reference to FIGS. 20A and 20B. The grommet 340 is tilted and its top end is inserted into the wire pull opening 360 so that the top wall 362 of the opening slides into the gap 358 between the upper tab 354 and the rear wall 350. The lower edge of the grommet 340 is then pivoted downwardly towards the opening. As this is done, the lower wall 364 of the grommet 340 is compressed upwardly to permit the lower locking tab 356 to slide past the lower wall 368 of the opening 360. A handle 368 is provided to aid in compressing the lower wall 364. Once the lower locking tab 356 moves past the lower wall 368 of the opening 360, the lower wall 364 of the grommet 340 is released and the lower wall 368 of the opening 360 slides into the gap 358 between the lower locking tab 356 and the rear wall 350 of the housing.

Figure 26:
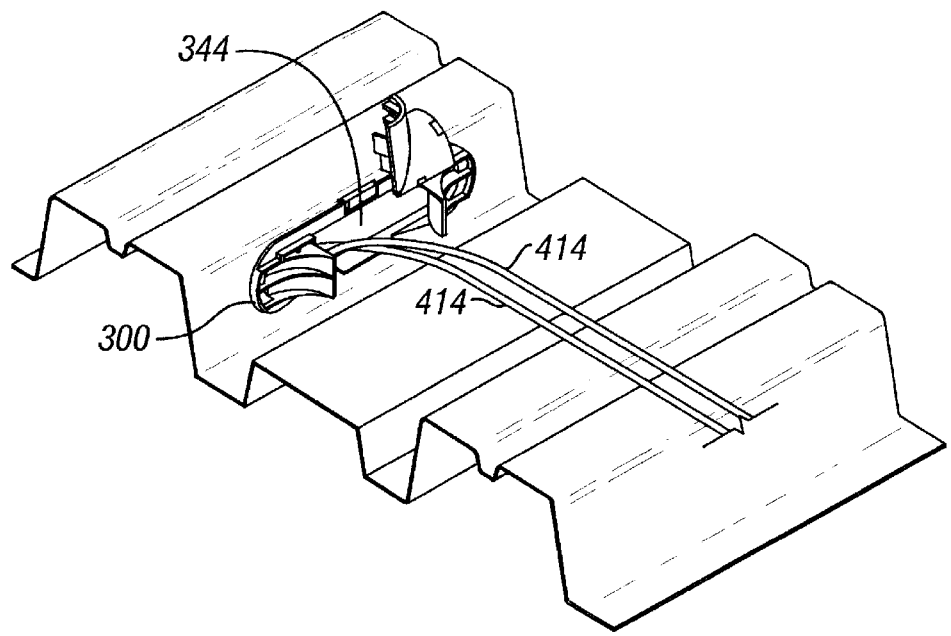
FIGS. 26 and 27 are installation drawings of the wire protection grommet and the bend radius attachment.
Figure 27:
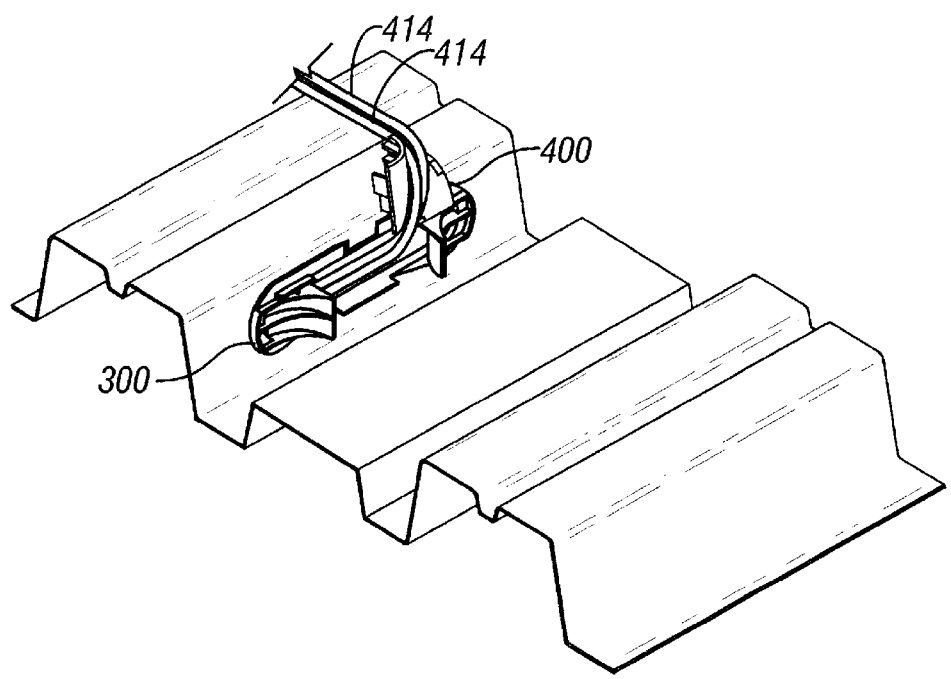

FIGS. 21 through 25 illustrate a bend radius element attachment 400 that can be used in conjunction with the grommet 300 of FIGS. 17–20. The bend radius attachment 400 presents first and second convex sections 402, 404 that extend generally perpendicular to one another. The bend radius attachment 400 can be secured to the upper wall 366 of the grommet 300, adjacent to an end of the central passage 344. For this purpose, the bend radius attachment 400 includes a pair of legs 406, 408 that are configured to slide into reciprocal apertures or slots 410 in the grommet 300. At least one of the legs 406, 408 includes a locking tab 414 that snaps into the grommet 300 to fixedly secure the bend radius attachment 400 to the grommet 300. While the bend radius attachment 400 is shown as a separate element, it should be appreciated that this element could be formed integrally with the grommet 300. In use, the bend radius attachment 400 is preferably installed after the grommet is mounted in the wire pull opening. As can be seen in FIG. 26, wires or cables 414 extend from the raceway and through the central passage 344 of grommet 300. The cables 414 can then be bent upwardly and back around the bend radius attachment 400 in a direction that is approximately perpendicular to that of the raceway below. (See FIG. 27) Openings 416 are provided on the bend radius attachment 400 to allow the cables to be secured to the bend radius attachment, e.g. with cable ties. The bend radius attachment allows cabling to bend approximately 90 degrees while still maintaining a bend radius of approximately 1.25 inches into an adjoining raceway below.

FIG. 28A is a partial perspective view of a raceway system illustrating installation of grommets 40, 340 constructed in accordance with the first and third embodiments. The raceway system comprises a cellular raceway 10 as described above. Activation boxes, e.g., presets 24, are connected to the raceway at selected locations for providing access to the cellular raceway from above the finished floor. Feeder ducts 416 (one shown) extend between the cellular raceway 10 and a distribution closet (not shown) to allow cables to be routed from the closet and into the cellular raceway 10. As illustrated, the feeder ducts 416 typically run perpendicular to the cells of the cellular raceway, and they are mounted on top of the cellular raceway 10. In use, cables 414 are routed from the distribution closet, through the feeder duct 10, into the cellular raceway 10, and in turn into the activation boxes. The grommets 340 and 40 prevent damage to the cables and ensure that the proper bend radius is maintained in the cables at their transitions from the feeder duct to the raceway cell and from the raceway cell to the activation box, respectively.

What is claimed is:

1. A wire protection grommet for installation in a wire pull opening at the junction of a feeder duct and a cell of a cellular raceway comprising:

a housing configured for mounting in the wire pull opening and defining a passage which extends through the wire pull opening when the grommet is installed in the wire pull opening, and the passage having a convex surface of a predetermined radius which defines a wire pull strain relief for wires that pass through said passage; and a bend radius attachment secured to the grommet at a location which is on the exterior of the raceway cell when the grommet is mounted in the wire pull opening, the bend radius attachment defining a further wire pull strain relief for wires passing between the feeder duct and the raceway cell.

2. A wire protection grommet for installation in a wire pull opening to the cell of a cellular raceway system, the cell having an interior and an exterior, the grommet comprising:

a housing configured to be mounted in the wire pull opening, the housing defining a passage which extends through the wire pull opening and between the interior and exterior of the raceway cell; and a bend radius attachment connectable to the housing at a location on the exterior of the cell.

3. A wire protection grommet as set forth in claim 2, wherein the grommet is configured for installation in a wire pull opening located at the junction of a feeder duct and a cellular raceway.

* * * * *